(12) United States Patent
Goux et al.

(10) Patent No.: US 6,790,505 B1
(45) Date of Patent: Sep. 14, 2004

(54) ADHESIVE TAPE COMPRISING A WOVEN POLYESTER SUPPORT DETACHABLE BY HAND

(75) Inventors: Alain Goux, Nievroz (FR); Rémi Barnet, Chambery (FR)

(73) Assignee: Scapa Tapes France S.A., Bellegarde sur Valserine Cedex (FR)

( * ) Notice: Subject to any disclaimer, the term of this patent is extended or adjusted under 35 U.S.C. 154(b) by 32 days.

(21) Appl. No.: 09/806,464
(22) PCT Filed: Aug. 1, 2000
(86) PCT No.: PCT/FR00/02211
§ 371 (c)(1), (2), (4) Date: May 10, 2001
(87) PCT Pub. No.: WO01/09263
PCT Pub. Date: Feb. 8, 2001

(30) Foreign Application Priority Data
Aug. 2, 1999 (FR) .............................. 99 10029

(51) Int. Cl.⁷ ................................ B32B 7/12
(52) U.S. Cl. .................. 428/114; 428/343; 442/149; 442/150; 442/151; 442/205
(58) Field of Search ................. 442/149, 150, 442/151, 205; 428/343, 114

(56) References Cited

U.S. PATENT DOCUMENTS 4,439,482 A    3/1984  Suematsu 5,698,477 A   12/1997  Iwamaru et al.

FOREIGN PATENT DOCUMENTS

| DE | 4442092 | 5/1996 |
|----|---------|--------|
| DE | 4442093 | 5/1996 |
| EP | 0478784 | 4/1992 |
| EP | 0668336 | 8/1995 |
| JP | 62-28436 | 2/1987 |
| JP | 2-208385 | 8/1990 |

OTHER PUBLICATIONS

English Language Translation of JP 62–28436.
English Language Translation of JP 2–208385.
English Language Abstract of JP 2–208385.
XP 002135622.
XP 002135623.

*Primary Examiner*—Elizabeth M. Cole
(74) *Attorney, Agent, or Firm*—Greenblum & Bernstein, P.L.C.

(57) ABSTRACT

Adhesive tape comprising a support which is woven from a plurality of threads formed at least in the majority of ethylene polyterephthalate. At least some of the plurality comprise longitudinal threads extending in a longitudinal direction of the adhesive tape. At least some of the plurality comprise transverse threads extending transversely relative to the longitudinal direction. A layer of adhesive covers at least one face of the support. A titre of the longitudinal threads per unit width of the adhesive tape is lower than a titre of the longitudinal threads per unit length of the adhesive tape and at least equal to 2500 dtex/cm. The longitudinal threads are held in place in the transverse direction by the adhesive, so as to give to the adhesive tape a transverse tearing stress of less than 10 N.

21 Claims, 1 Drawing Sheet

ADHESIVE TAPE COMPRISING A WOVEN POLYESTER SUPPORT DETACHABLE BY HAND

CROSS-REFERENCE TO RELATED APPLICATIONS

The present application is a National Stage Application of International Application No. PCT/FR00/02211, filed Aug. 1, 2000. Further, the present application claims priority under 35 U.S.C. § 119 of French Patent Application Nos. 99/10029 filed on Aug. 2, 1999.

BACKGROUND OF THE INVENTION

1. Field of the Invention

The invention relates to adhesive tapes in general, and in particular those used for taping bundles of cable, more particularly in car construction.

2. Discussion of Background Information

An important feature of an adhesive tape is that it should be easily tearable by hand. In fact, for a manual application, the tearability of the adhesive tape makes it possible to do away with the use of a cutting tool, which at the same time limits the risk of injury and the handling time.

The tearability of an adhesive tape is linked largely to the support, its compactness, its method of manufacture, but also to the type of fibres used. Each type of fibre is associated with mechanical and physico-chemical properties which define the fields of application of the adhesive tape, in particular in terms of ambient temperature in which the adhesive tape is placed.

Cotton or viscose fabrics, which have currently been used for many years, resist temperatures of 100 to 125° C. (thermal class T2 according to the classification adopted in the car industry) and have good manual tearability. Their resistance to abrasion is moderate.

Also used are fabrics of synthetic fibres known in general as polyester fibres. Polyester fabrics bring, by their chemical properties and their appearance, very good resistance to abrasion coupled with good resistance to temperature (150 to 175° C., thermal class T4). Their use is therefore linked to applications where high temperatures are noted (engine bonnets) and where friction against metal parts is possible.

Manufacturing methods using techniques other than weaving give rise to good tearability by hand with polyester fibers, which makes it possible to retain good properties of temperature resistance (classification T3 in the car). These are techniques of manufacturing non-woven supports of the Maliwatt and Malivlies types. Adhesive tapes DE 4442092 A and DE 4442093 A. On the other hand, taking into account the manufacturing method, the resistance to abrasion of this type of substrate is lower than that with a woven base.

Table 1 summarises the properties of different types of known adhesive tapes formed from synthetic or natural fibres. The class of temperature refers to car classification.

TABLE 1

| Type of support | Woven | | Non-woven | |
|---|---|---|---|---|
| Type of fibres | Viscose or cotton | Polyester | Maliwatt polyester | Malivlies polyester |
| Class of temp. | T2 (100° C.) | T4 (150° C.) | T3 (125° C.) | T3 (125° C.) |
| Abrasion resistance | ** | *** | * | * |
| Tearability | *** | no | ** | *** |

* average
** good
*** excellent

The known adhesive tapes with a polyester fabric base are not tearable by hand, unlike certain other products existing on the market. Taking into account the very good properties of polyester fabrics, there is a real demand for this type of product in a tearable form.

SUMMARY OF THE INVENTION

The invention therefore provides an adhesive tape with a woven support with a base of polyester fibers having the property of being tearable by hand.

The invention relates in particular to an adhesive tape comprising a woven support from threads formed at least in the majority of polyester fibres, some of which extend in the longitudinal direction of the tape and others of which extend transversely, and an adhesive layer covering at least one face of the support.

The invention provides that the titre of the longitudinal threads per unit width of the tape is lower than the titre of the transverse threads per unit length of the tape and at most equal to 2500 dtex/cm, the longitudinal threads being kept in place in the transverse direction by the adhesive, so as to confer on the tape a transverse tearing stress of less than 10 N.

The titre of the threads per unit width or length is the product of the unit titre of the threads by the number of threads per unit width or length. The lowering of this property for the longitudinal threads, which are normally the warp threads of the fabric forming the support, reduces the transverse tearing stress, i.e. the traction stress which must be exerted on the tape in the longitudinal direction in order to tear it along a transverse line starting from an existing notch. This stress is usually determined by the method AFERA 4007. A value lower than 10 N permits easy tearing by hand.

It is also necessary in this respect to immobilise the longitudinal threads in the transverse direction, without which they move closer together in the direction of one of the sides of the tape when the other side is stressed in traction in order to tear the tape, so that it would be necessary to break a plurality of threads at the same time, which would multiply the force to be exerted in order to achieve breakage. This immobilisation is effected according to the invention by the layer of adhesive covering the woven support, whose contact with each thread is continuous throughout the length thereof, or only has very short interruptions.

Advantageously, the transverse threads are relatively close, i.e. numerous per unit width, which contributes to the stability of the position of the longitudinal threads in the lateral direction.

In order to control the properties of the threads, inter alia the number of elementary filaments composing each of them may be modified.

The invention provides also for an adhesive tape comprising a support which is woven from a plurality of threads formed at least in the majority of ethylene polyterephthalate, at least some of the plurality comprising longitudinal threads which extend in a longitudinal direction of the adhesive tape, at least some of the plurality comprising transverse threads extending transversely relative to the longitudinal direction, and a layer of adhesive covering at least one face of the support, wherein a titre of the longitudinal threads per unit width of the adhesive tape is lower than a titre of the transverse threads per unit length of the adhesive tape and at least equal to 2500 dtex/cm, the longitudinal threads being held in place in the transverse direction by the adhesive, so as to give to the adhesive tape a transverse tearing stress of less than 10 N.

The titre of the transverse threads per unit length may be between 3000 and 4500 dtex/cm. The longitudinal threads may be arranged closer to one another and have a lower unit titre than the transverse threads. A number of the longitudinal threads may comprise between 30 and 50 longitudinal threads per cm width. A number of the transverse threads may comprise between 18 and 27 transverse threads per cm length. The titre of the longitudinal threads may be between about 40 and 60 dtex. The titre of the transverse threads may be between 150 and 250 dtex. The adhesive may be sensitive to pressure. The adhesive tape may further comprise an anti-adhesive layer covering a face of the support which is opposite the face which is covered by the adhesive. The plurality of threads may be dyed in bulk.

The invention also provides for an adhesive tape comprising a support comprising a plurality of threads, a first face and a second face, each of the plurality of threads comprising ethylene polyterephthalate, at least some of the plurality comprising longitudinal threads being arranged in a longitudinal direction, at least some of the plurality comprising transverse threads being arranged transversely relative to the longitudinal direction, a layer of adhesive arranged on the first face, and an anti-adhesive layer arranged on the second face, wherein a titre of the longitudinal threads per unit width of the adhesive tape is lower than a titre of the transverse threads per unit length of the adhesive tape and at least equal to 2500 dtex/cm, the longitudinal threads being held in place in the transverse direction by the adhesive, so as to give to the adhesive tape a transverse tearing stress of less than 10 N.

The titre of the transverse threads per unit length may be between 3000 and 4500 dtex/cm. The longitudinal threads may be arranged closer to one another and have a lower unit titre than the transverse threads. A number of the longitudinal threads may comprise between 30 and 50 longitudinal threads per cm width. A number of the transverse threads may comprise between 18 and 27 transverse threads per cm length. The titre of the longitudinal threads may be between about 40 and 60 dtex. The titre of the transverse threads may be between 150 and 250 dtex. The adhesive may be sensitive to pressure. Each of the plurality of threads may be dyed.

The invention also provides for an adhesive tape comprising a plurality of threads forming a support comprising a first face and a second face, each of the plurality of threads comprising ethylene polyterephthalate. At least some of the plurality comprise longitudinal threads which are arranged in a longitudinal direction. At least some of the plurality comprising transverse threads which are arranged transversely relative to the longitudinal direction, a layer of pressure sensitive adhesive arranged on the first face, and a non-adhesive layer arranged on the second face. A titre of the longitudinal threads per unit width of the adhesive tape is lower than a titre of the transverse threads per unit length of the adhesive tape and at least equal to 2500 dtex/cm. The longitudinal threads are held in place in the transverse direction by the adhesive, so as to give to the adhesive tape a transverse tearing stress of less than 10 N.

Optional, complementary or alternative features of the invention are given below:

The titre of the transverse threads per unit length is between 3000 and 4500 dtex/cm.

The longitudinal threads are closer and have a unit titre which is lower than the transverse threads.

The support comprises between 30 and 50 longitudinal threads per cm width.

The support comprises between 18 and 27 transverse threads per cm length.

The titre of the longitudinal threads is between about 40 and 60 dtex

The titre of the transverse threads is between 150 and 250 dtex.

The adhesive is sensitive to pressure.

The support is covered with an anti-adhesive coating on its face opposite to the adhesive.

The threads of the support are dyed in bulk.

BRIEF DESCRIPTION OF THE DRAWINGS

The features and advantages of the invention will be disclosed in more detail in the following description, with reference to the attached drawings.

DETAILED DESCRIPTION OF THE INVENTION

By way of non-limiting example, a fabric was made using threads with multiple filaments formed of polyester fibers, dyed continuously black in bulk by a dye resistant to a temperature of 150° C. Weaving is effected by way of air jet or water jet, using 40 warp threads per centimeter, with a unit titre of 50 dtex, and 22 weft threads per centimeter, of a unit titre of 167 detx. The woven support obtained is covered on one face with a pressure-sensitive adhesive with a rubber base modified by resins, dissolved in toluene, and on the other face with an anti-adhesive varnish applied by the technique known as "reverse roll" (coat by cylinder transfer). An adhesive tape obtained by cutting out the support thus covered parallel to the warp threads has excellent temperature resistance (thermal class T4) and good resistance to abrasion.

Figure 1:
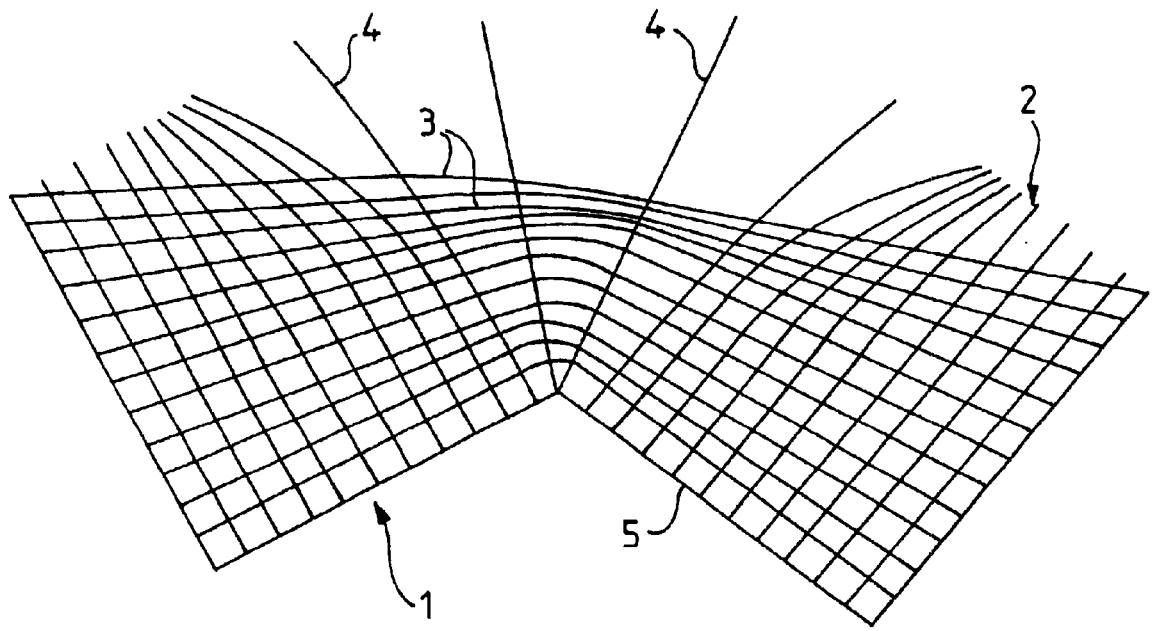
FIG. 1 shows the displacement of the threads of a fabric tape not covered with an adhesive when one tries to tear it manually.

FIG. 1 shows the behaviour of the threads of a tape 1 of polyester fabric not covered with adhesive and/or whose transverse threads are not very close, when one tries to tear it by hand by applying longitudinal traction to one of its edges 2. The longitudinal threads 3 adjacent to the edge 2 are taut and shift along the transverse threads 4 in the direction of the opposite edge 5, thus approaching one another. A plurality of threads are therefore simultaneously under traction, which makes them difficult to break due to the increase in the number of tex per unit width.

Figure 2:
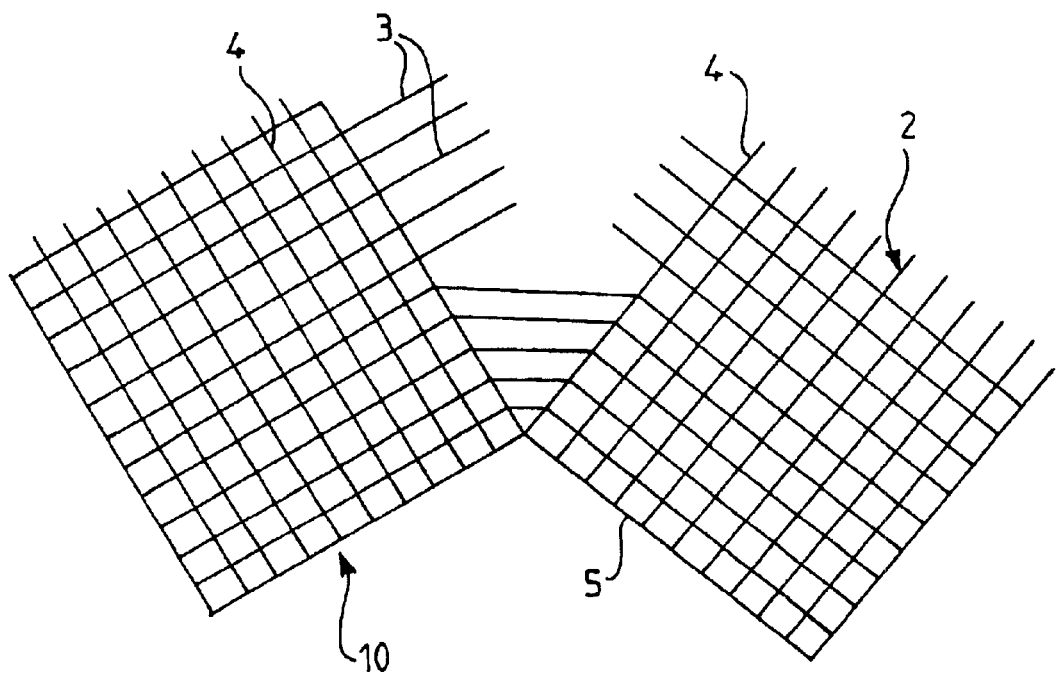
FIG. 2 shows the breakage of the longitudinal threads of an adhesive tape according to the invention when one tears the same by hand.

FIG. 2, where the same reference numbers are used as in FIG. 1 to designate similar elements, shows the behaviour in the same conditions of an adhesive tape 10 according to the invention. The longitudinal threads 3 are immobilised in the transverse direction by the layer of adhesive and by a slight spacing of the transverse threads. They are therefore stressed under traction and break one after another.

Table 2 indicates the transverse tearing force determined by the method AFERA 4007 for the adhesive tape of the example above (A) and, by way of comparison, for the support of this tape when not coated (B), for an adhesive tape with a woven support of rayon and sold by the Applicants under the reference 003 (C), and for an adhesive tape with a non-woven support of polyester which is commercially available (D).

TABLE 2

| Tape | A | B | C | D |
|---|---|---|---|---|
| Transverse tearing stress (N) | 3.73 | 12.03 | 6.06 | 8.93 |

These results underline the optimum tearability of the adhesive tape according to the invention with respect to both the support not covered with adhesive and known adhesive tapes.

The blackening of the threads in bulk, or other colouring, allows the adhesive tape according to the invention to withstand temperatures up to 150° C. without alteration of its appearance.

The adhesive used according to the invention is advantageously a pressure-sensitive adhesive with a rubber or acrylic base in solution in an organic solvent or a dispersion in water, or a pressure-sensitive adhesive without solvent, e.g. of the heat-meltable type, or capable of cross-linking by UV radiation or electron bombardment. The adhesive may be applied by any known technique, e.g. with a scraper on to a cylinder or plane surface, cylinder to cylinder or by means of a die for heat-meltable adhesive.

What is claimed is:

1. An adhesive tape comprising:
    a support which is woven from a plurality of threads formed at least in the majority of ethylene polyterephthalate;
    at least some of the plurality comprising longitudinal threads which extend in a longitudinal direction of the adhesive tape;
    at least some of the plurality comprising transverse threads which extend transversely relative to the longitudinal direction; and
    a layer of adhesive covering at least one face of the support,
    wherein a titre of the longitudinal threads per unit width of the adhesive tape is lower than a titre of the transverse threads per unit length of the adhesive tape and at most equal to 2500 dtex/cm, the longitudinal threads being held in place in the transverse direction only by the adhesive, so as to give to the adhesive tape a transverse tearing stress of less than 10 N.

2. The adhesive tape of claim 1, wherein the titre of the transverse threads per unit length is between 3000 and 4500 dtex/cm.

3. The adhesive tape of claim 1, wherein the longitudinal threads are arranged closer to one another and have a lower unit titre than the transverse threads.

4. The adhesive tape of claim 1, wherein a number of the longitudinal threads comprises between 30 and 50 longitudinal threads per cm width.

5. The adhesive tape of claim 1, wherein a number of the transverse threads comprises between 18 and 27 transverse threads per cm length.

6. The adhesive tape of claim 1, wherein the titre of the longitudinal threads is between about 40 and 60 dtex.

7. The adhesive tape of claim 1, wherein the titre of the transverse threads is between 150 and 250 dtex.

8. The adhesive tape of claim 1, wherein the adhesive is sensitive to pressure.

9. The adhesive tape of claim 1, further comprising an anti-adhesive layer covering a face of the support which is opposite the face which is covered by the adhesive.

10. The adhesive tape of claim 1, wherein the plurality of threads are dyed in bulk.

11. An adhesive tape comprising:
    a support comprising plurality of threads, a first face and a second face;
    each of the plurality of threads comprising ethylene polyterephthalate;
    at least some of the plurality comprising longitudinal threads arranged in a longitudinal direction;
    at least some of the plurality comprising transverse threads arranged transversely relative to the longitudinal direction;
    a layer of adhesive arranged on the first face; and
    an non-adhesive layer arranged on the second face,
    wherein a titre of the longitudinal threads per unit width of the adhesive tape is lower than a titre of the transverse threads per unit length of the adhesive tape and at most equal to 2500 dtex/cm, the longitudinal threads being held in place in the transverse direction only by the adhesive, so as to give to the adhesive tape a transverse tearing stress of less than 10 N.

12. The adhesive tape of claim 11, wherein the titre of the transverse threads per unit length is between 3000 and 4500 dtex/cm.

13. The adhesive tape of claim 11, wherein the longitudinal threads are arranged closer to one another and have a lower unit titre than the transverse threads.

14. The adhesive tape of claim 11, wherein a number of the longitudinal threads comprises between 30 and 50 longitudinal threads per cm width.

15. The adhesive tape of claim 11, wherein a number of the transverse threads comprises between 18 and 27 transverse threads per cm length.

16. The adhesive tape of claim 11, wherein the titre of the longitudinal threads is between about 40 and 60 dtex.

17. The adhesive tape of claim 11, wherein the titre of the transverse threads is between 150 and 250 dtex.

18. The adhesive tape of claim 1, wherein the adhesive is sensitive to pressure.

19. The adhesive tape of claim 11, wherein each of the plurality of threads is dyed.

20. An adhesive tape comprising:
    a plurality of threads forming a support comprising a first face and a second face;
    each of the plurality of threads comprising ethylene polyterephthalate;
    at least some of the plurality comprising longitudinal threads which are arranged in a longitudinal direction;
    at least some of the plurality comprising transverse threads which are arranged transversely relative to the longitudinal direction;
    a layer of pressure sensitive adhesive arranged on the first face; and a non-adhesive layer arranged on the second face, wherein a titre of the longitudinal threads per unit width of the adhesive tape is lower than a titre of the transverse threads per unit length of the adhesive tape and at most equal to 2500 dtex/cm, the longitudinal threads being held in place in the transverse direction only by the adhesive, so as to give to the adhesive tape a transverse tearing stress of less than 10 N.

21. An adhesive tape comprising:

a support which is woven from a plurality of threads formed at least in the majority of ethylene polyterephthalate;

at least some of the plurality comprising longitudinal threads which extend in a longitudinal direction of the adhesive tape;

at least some of the plurality comprising transverse threads which extend transversely relative to the longitudinal direction; and a layer of adhesive covering at least one face of the support, wherein a titre of longitudinal threads per unit width of the adhesive tape is lower than a titre of the transverse threads per unit length of the adhesive tape and at most equal to 2500 dtex/cm, and at least one of:

the longitudinal threads being held in place in the transverse direction only by the adhesive, so as to give to the adhesive tape a transverse tearing stress of less than 10 N; and before the adhesive is applied to the support, the longitudinal threads are not immobilized, and wherein after the adhesive is applied to the support, the longitudinal thread are held in place in the transverse direction by the adhesive, so as to give to the adhesive tape a transverse tearing stress of less than 10 N.

* * * * *